(12) United States Patent
Perl et al.

(10) Patent No.: US 7,870,984 B2
(45) Date of Patent: Jan. 18, 2011

(54) HOUSING WITH LID AND KINEMATIC FRAME

(75) Inventors: Michael Perl, Bad Endorf (DE); Georg Sigl, Arnstorf (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 1416 days.

(21) Appl. No.: 11/047,749

(22) Filed: Feb. 2, 2005

(65) Prior Publication Data

US 2005/0199664 A1 Sep. 15, 2005

(30) Foreign Application Priority Data

Feb. 3, 2004 (DE) .................. 10 2004 005 265

(51) Int. Cl.
*B60R 7/00* (2006.01)
*B60R 11/06* (2006.01)
*B65D 43/26* (2006.01)

(52) U.S. Cl. ............... 224/282; 224/275; 296/37.8; 220/264

(58) Field of Classification Search .......... 224/282, 224/275, 929; 296/37.8; 220/264
See application file for complete search history.

(56) References Cited

U.S. PATENT DOCUMENTS

| | | | | |
|---|---|---|---|---|
| 5,144,720 A | * | 9/1992 | Aihara et al. ................. 16/232 |
| 5,195,272 A | * | 3/1993 | Yamada ........................ 49/193 |
| 5,357,652 A | * | 10/1994 | Yamada ........................ 16/232 |
| 5,647,652 A | * | 7/1997 | Zalewski et al. ............. 312/324 |
| 5,931,336 A | | 8/1999 | Takeuchi |
| 6,142,333 A | * | 11/2000 | Sasamoto et al. ........... 220/264 |
| 6,250,729 B1 | * | 6/2001 | Allison et al. ................ 312/324 |
| 6,616,205 B2 | * | 9/2003 | Bruhnke et al. ............. 296/37.8 |
| 6,733,096 B2 | * | 5/2004 | Bae ............................. 312/324 |
| 6,761,278 B2 | * | 7/2004 | Hyp et al. ................. 220/254.2 |

FOREIGN PATENT DOCUMENTS

| JP | 2002104076 A | * | 4/2002 |
|---|---|---|---|
| JP | 2002193010 A | * | 7/2002 |
| JP | 2002337614 | * | 11/2002 |
| JP | 2002337614 A | * | 11/2002 |

* cited by examiner

*Primary Examiner*—Nathan J Newhouse
*Assistant Examiner*—Lester L Vanterpool
(74) *Attorney, Agent, or Firm*—Sughrue Mion, PLLC

(57) ABSTRACT

The invention relates to a device for holding objects, preferably a telephone, in particular for use in a center arm rest and/or the center console of a vehicle, with a frame or receptacle and a reversibly closable lid which is mounted so that it may be swiveled in each case about one of the rotary axes arranged in the region of the upper closing edges of the side walls of the frame or container and lying essentially parallel to the closing edges. The lid has an opening and closing mechanism which is arranged in a function carrier frame that may be connected to the lid. In addition, the invention relates to a method for the production of a device for holding objects, in particular for use in a center arm rest and/or the center console of a vehicle.

21 Claims, 3 Drawing Sheets

HOUSING WITH LID AND KINEMATIC FRAME

FIELD OF THE INVENTION

The invention relates to a device for holding objects, preferably a telephone, in particular for use in a centre arm rest and/or the centre console of a vehicle, with a frame or receptacle and a reversibly closable lid. In addition, the invention relates to a centre arm rest with a device of this kind. Finally, the invention relates to a method for the production of a device for holding objects, preferably a telephone, in particular for use in a centre arm rest and/or the centre console of a vehicle in which a function carrier frame is arranged in a closable lid.

PRIOR ART

The centre arm rests or centre consoles of vehicles, particularly in vehicles of the upper mid-size or full-size categories, often contain storage compartments which could be used to store objects that need to be stowed, for example a car telephone. These are usually covered by hinged lids or sliding louvre systems. In such cases, hinged lids are arranged on a frame or on the receptacle in such a way that they may be at least swiveled approximately 90° about a swivel axis. A first embodiment of a hinged lid of this kind swiveled about a rotary axis arranged perpendicular to the longitudinal alignment of the centre arm rest or centre console. However, this meant that people sitting in the rear seats of a vehicle were unable to reach the telephone or the stowed objects.

Therefore, U.S. Pat. No. 5,931,336 provided a receptacle in which the lid could be swiveled about two opposing rotary axes positioned parallel to the side faces of the receptacle. This enabled the receptacle to be opened both by the driver and from the passenger side, hence providing access to the stored objects, in particular to a telephone stored in the receptacle, from the side in question. Vehicle occupants sitting in the rear seats therefore had unrestricted access to the contents of the receptacle in both open positions. However, in practice, it was found that with receptacles of this kind it was not possible to prevent the simultaneous release of arresting means on both swivel axes in an adequate way.

The receptacle disclosed in U.S. Pat. No. 5,931,336 was produced in that the individual kinematic parts, that is all arresting means, spring elements, force transmission elements, actuators or similar were arranged on the lid, secured and connected to each other on the lid. Here, the kinematic parts were secured by screwing and/or welding the individual parts to the lid. However, in practice, this method of production was found to be particularly complicated and cost-intensive. In particular, it was not possible to replace individual parts of the device if they were not functioning as intended.

DESCRIPTION OF THE INVENTION

It was therefore an object of the invention to provide a device for holding objects, preferably a telephone, in particular for use in a centre arm rest and/or the centre console of a vehicle that does not have the problems known from the prior art. It was also an object of the invention to provide a centre arm rest used to hold a device of this kind. A final object of the invention was to provide a method for the production of a device that overcomes the above-described problems.

In a first aspect of the invention, a device is provided to hold objects, which comprises a frame or receptacle and a reversibly closable lid. Here, the lid is mounted so that it may be swiveled in each case about one of the rotary axes in the region of the upper closing edges of the side walls of the frame or receptacle and substantially parallel to the closing edges. The lid also comprises an opening and closing mechanism which is arranged in a function carrier frame that may be connected to the lid. The device also has a securing mechanism that prevents the simultaneous unlocking of both arresting devices.

A device was developed in which the lid cannot be completely released from the receptacle or frame by the inadvertent unlocking of both arresting devices. In addition, a device was developed which due to its design is particularly simple to produce and also permits a functional check of the kinematic parts connected to each other before assembly. In a surprisingly simple way, this, on the one hand, reduces the production reject rate for the device according to the invention to a minimum and, on the other, guarantees the reliable functioning of the opening and closing mechanism of the device according to the invention.

According to a second aspect of the invention, a centre arm rest is provided which is able to hold the device according to the invention according to the first aspect of the invention. In this way, a centre arm rest is provided that, preferably without any impairment to the appearance and handling, is able to exploit the advantages of the device according to the invention. In particular, there is no restriction on the use of the centre arm console according to the invention. For example, in a way according to the invention, the device's lid may be opened and closed on two sides including when the centre arm rest is in a swiveled position, for example after the centre arm rest has been raised.

According to a third aspect of the invention, a method is provided for the production of a device for holding objects, preferably a telephone, in particular for use in a centre arm rest and/or the centre console in a vehicle with a frame or receptacle and a reversibly closable lid mounted so that it may be swiveled about at least one rotary axis. On the lid, preferably within a holder in the lid, is a function carrier frame which in a first step in the method according to the invention is substantially connected to all the components required for the opening and closing movements and preferably for the arresting of the lid. After the assembly of this function carrier frame, on which preferably all functions may be checked, connection to the lid takes place. This provides a method which is particularly simple to perform and in particular facilitates a functional check even before the kinematic parts are connected to the lid.

The device according to the invention comprises a lid which is able to close a frame or receptacle in a reversible way. Said frame or receptacle comprises two substantially parallel side walls and end walls substantially perpendicular thereto. The reversibly closable lid is mounted on this frame or receptacle in the region of the upper closing edges of the side walls in such a way that the lid may be swiveled either about a first swivel axis or about a second swivel axis.

A frame is always used in the way according to the invention if the device may be arranged by means of a holder already located in the centre console or one of the centre arm rests. However, it is also conceivable that the device according to the invention comprises a receptacle so that there is no need to provide a holder in the relevant vehicle component. In such cases, it is sufficient if, at the locations into which the device according to the invention is to be installed, mounting devices to which the device may be fixed are installed.

In a first preferred embodiment of the device according to the invention, in closed position the lid covers the frame or receptacle substantially completely. This provides a device in which the number of parts to be opened and closed may be reduced to a minimum.

In another preferred embodiment of the device according to the invention, the lid has at least two arresting devices arranged on the side areas of the device. This makes it possible for the lid's arresting device to be released from both sides in the same way. In particular, with an embodiment of this kind, it is possible in a particularly preferred way to choose the swivel direction of the lid as required.

In a quite preferably preferred embodiment of the invention, the arresting devices are arranged on the sides of the lid. This supports the manipulability of the device according to the invention in a particularly advantageous way. In particular, since a movement is triggered by actuating elements arranged on the part to be moved, the ability of the vehicle's occupants to choose the various functions provided in the vehicle is particularly advantageously supported.

In another preferred embodiment of the invention, the lid may be locked in its open position. This provides a device in which an undesired closing of the lid is reliably prevented. This will in particular prevent fingers or a telephone cable from being trapped.

In another preferred embodiment of the invention, the lid is mounted so that it may be swiveled about an angle of 80 to 90°, particularly preferably about approximately 85° out of its closed position. This provides a device which is particularly advantageously adapted for use in the centre console and/or the centre arm rest in a vehicle. In particular, it means that the opening of the lid does not cover up other control elements in the vehicle, even occasionally, hence making them inaccessible to the occupants of the vehicle.

In another preferred embodiment of the invention, the function carrier frame is arranged on the lid, preferably in a holder arranged in the underside of the lid. This ensures that the function carrier frame and the function carrier arranged therein are not only protected from mechanical influences but also may be integrated in the device in a non-visible way.

In another preferred embodiment, all the parts required for the movement or movements of the lid, which according to the invention are summarized under the term "kinematic means" may be installed and assembled on the function carrier frame. This provides a device with a particularly simple design and in addition permits the assembly of the function carrier frame independently of the production and assembly of the receptacle and/or lid.

In a greatly preferred embodiment of the invention, arranged in the function carrier frame, apart from the kinematic means, are the arresting means and any actuators, securing elements, in particular springs and locking means and/or spring-force transmitting elements connected to said springs. This provides a device which, in a particularly simple way, comprises all the elements required for the movement and for controlling and selecting different movements.

In a quite particularly preferred embodiment of the invention, the function carrier frame has an additional cover for the kinematic means. This ensures that when the lid is open, the kinematic means are neither visible nor exposed to mechanical influences. In addition, disruption or damage to the kinematic means caused by objects stored in the receptacle is reliably prevented.

In another preferred embodiment of the invention, the receptacle or frame comprises holders in the region of the upper closing edges of the side walls which, in swiveled or locked position, engage with corresponding pivot and locking pins arranged on the lid. This mounting of the lid on the holders is separated as a result of the releasing of the arresting means on the side of the rotary axis in each case. This provides a particularly simple mounting of the lid on the frame or receptacle which in addition is provided with particularly simple detachable means for executing the swivel movements.

In another preferred embodiment of the invention, the receptacle or frame comprises pivot and locking pins in the region of the upper closing edges of the side walls which, in swiveled or locked position, engage with corresponding holders arranged on the lid. Similarly to the above described alternative embodiment of the invention, the swivelable lid is mounted by means of pivot and locking pins arranged in holders, but the holders are arranged within the lid. This in particular makes it possible for the unlocking mechanism to be provided substantially on the receptacle or frame, but not on the lid.

In a quite particularly preferred embodiment, in the above-described alternative embodiment, the pivot pins are arranged so they may be released from the holders by means of the arresting devices. This provides a lid connection that is particularly simple for the vehicle's occupants to release on the one hand and, on the other, a frame or receptacle with which the mounting elements for the execution of a swivel movement about the relevant swivel axis simultaneously serve as arresting means for the execution of a swivel movement about the other opposite swivel axis.

In a greatly preferred embodiment of the invention, the securing mechanism permits the release of the pivot pins from the holders on a first side of the device only in cases in which the pivot pins on a second side of the device are engaged with the corresponding holders. This ensures that the two-sided release of the lid mountings comprising pivot pins and corresponding holders on both sides is prevented. Therefore, particularly simple means prevent the lid from being completely released from the frame or receptacle.

According to another aspect of the present invention, a centre arm rest for use in a vehicle is provided in which a device according to the invention is used. In a preferred embodiment of the centre arm rest according to the invention, the above-described device serves as a holder for a telephone. This provides a centre arm rest which, in a particularly advantageous way, covers a car telephone when it is not in use and prevents inadvertent contact with the telephone.

Here, the centre arm rest according to the invention is not restricted to the front area of the passenger cell between the driver and passenger seat, but may also be attached in the area of the rear seat bench or between two individual rear seats. In particular, in a way according to the invention, it is also conceivable that several centre arm rests of this type may be fitted in one single vehicle.

In another preferred embodiment of the centre arm rest according to the invention, it is mounted so that it may be swiveled about a rotary axis substantially perpendicular to the lid's swivel axis. This provides a centre arm rest in which the opening of the lid preferably does not influence the swivel movement of the centre arm rest. In particular with a telephone arranged in a front centre arm rest, this enables the telephone to be reached by people sitting in the rear seats of the vehicle with particularly simple means.

In another preferred embodiment of the centre arm rest according to the invention, at least parts of the devices, in particular the lid, comprise a decorative covering, preferably made of leather or a material similar to leather. This gives the centre arm rest a particularly advantageous appearance without restricting the function of the centre arm rest in any way.

According to a third aspect of the invention, a method is provided for the production of a device for holding objects, preferably a telephone, in particular for use in a centre arm rest and/or the centre console of a vehicle.

The device has a frame or receptacle and a reversibly closable lid which is mounted so that it may be swiveled about at least one rotary axis on the frame or receptacle. On the lid, preferably in a holder for the lid, there is also arranged a function carrier frame in which the device's essential kinematic means are arranged.

The method according to the invention includes the assembly of the function carrier frame with substantially all the parts required for the opening and closing movements and preferably for the arresting of the lid and the subsequent connection of the function carrier frame with the lid. This ensures that the assembly of the function carrier does not take place at the same time as the connection of the individual elements to the lid, but beforehand during the assembly of the function carrier frame. This in particular facilitates a functional check on the function carrier frame before the connection to the lid. This also facilitates the replacement of individual parts that are not functioning properly thus enabling the number of malfunctioning parts that have to be scrapped to be reduced to a minimum.

In a preferred embodiment of the method according to the invention, the function carrier frame is connected to the lid by latching the function carrier frame in connecting elements provided therefor or provided in the lid. In a particularly preferred embodiment of the method according to the invention, the connection is provided by one or more latching lugs and/or by holders corresponding to these latching lugs. This provides a connection between the function carrier frame and lid which is particularly simple to produce and release. Preferably, it is possible to completely dispense with complex welding and/or screwing of the function carrier frame to the lid.

In another particularly preferred embodiment of the method according to the invention, a device is provided with a lid that is mounted so that it may be swiveled about a rotary axis in the region of a side closing edge of a side wall of the frame or receptacle and parallel to the closing edge. This provides a method in which a hinged device may be produced with particularly simple means and particularly inexpensively.

In another preferred embodiment of the method according to the invention, the function carrier is arranged on the function carrier frame in such a way that a functional check may be performed, but the guidance of at least parts of the moving kinematic parts only takes place when the function carrier frame is connected to the lid. This provides a method in which a first functional check may be performed on the function carrier before assembly with the lid, but permanent function is only guaranteed after the assembly of the device. This provides a method in which the function carrier frame has a particularly simple structure which is preferably reduced to the basic functions of the functional carrier frame.

In another preferred embodiment of the method according to the invention, the function carrier frame is latched and/or screwed and/or welded to the lid. This provides a method in which the connection between the lid and function carrier frame is adapted to the requirements and circumstances in question in a particularly advantageous way.

BRIEF DESCRIPTION OF THE DRAWINGS

The invention will now be described in more detail with reference to FIGS. 1 to 4 which show examples of embodiments of the device according to the invention. However, the drawings do not restrict the general fundamental concept of the invention in any way.

WAYS OF CARRYING OUT THE INVENTION

Figure 1:
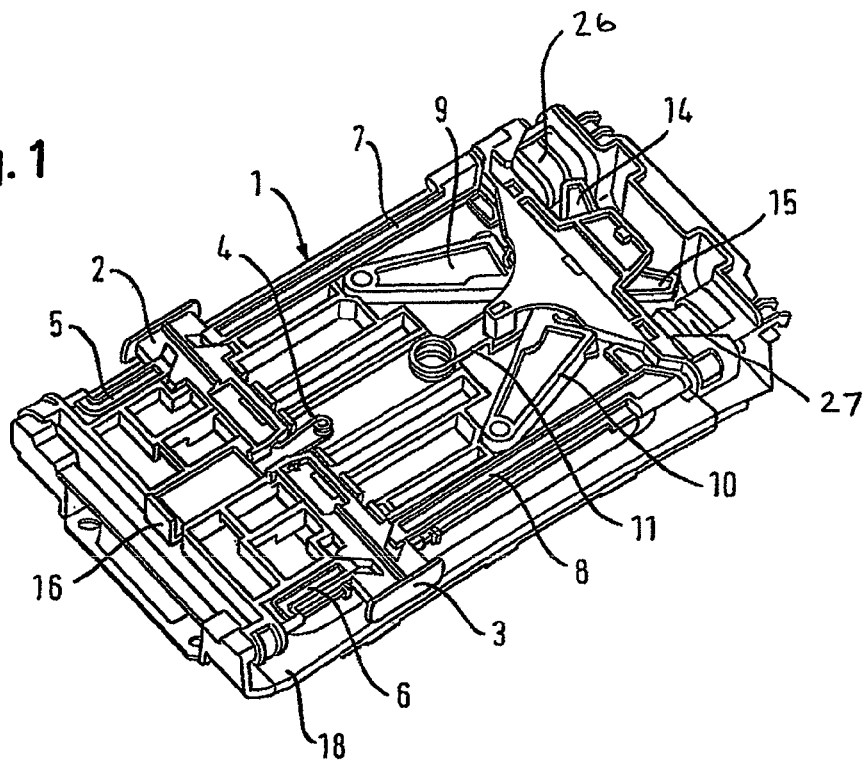
FIG. 1 shows lid of a device according to the invention connected to a function carrier frame

FIG. 1 shows a perspective view of a function carrier frame 1 connected to a lid. On its upper side, the function carrier frame 1 has a carrier button 2 which actuates a front slide 5 and a rear slide 7 by means of a guide bar arranged within the carrier button 2. Similarly to this, the function carrier frame 1 has a carrier button 3 on its underside which actuates a front slide 6 and a rear slide 8 by means of a guide bar arranged within the carrier button 3. The carrier button 2 and the carrier button 3 are arranged within the function carrier frame 1 so they may be moved linearly in relation to each other and both act on the restoring spring 4. In addition, arranged between the opposing ends of the carrier button 2 and the carrier button 3 is a blocking device 16 which prevents both carrier button 2 and carrier button 3 from being actuated when the lid is open. This blocking device 16 is designed so that it is released when the lid is closed and hence permits the actuation of either carrier button 2 or carrier button 3. When one of the carrier buttons 2, 3 is actuated, a pivot pin (not shown) arranged on the front slide 5 and a pivot pin (not shown) arranged on the rear slide 7 is moved along the longitudinal axis of the carrier button 2 and hence out of the receptacle or frame (shown only in part). This enables the lid to swivel about a swivel axis of the lid lying parallel to the front slide 6 and the rear slide 8. As soon as this causes the lid to swivel out of its closed position, the blocking device 16 engages in holders provided therefor on the carrier button 2 and the carrier button 3 in order to prevent the actuation of both buttons 2, 3. This position is only released again when the device is completely closed. When the blocking device 16 has been released, the carrier button 2 or the carrier button 3 is reset by the force applied by the spring 4. Arranged on the ends of the rear slides 7, 8 facing away from the respective carrier buttons 2, 3 are locking lugs 28, 29 which hold the positioning locks 9, 10 in their position acting against the spring 11. Connected to the respective locks 9, 10 are latching lugs 14, 15 which are connected to corresponding guides 26, 27 provided on the frame or receptacle (shown only in part) when the lid opens or closes. Finally, the function carrier frame 1 comprises a circumferential frame 18 by means of which the kinematic frame 1 is connected to the lid (not shown).

Figure 2:
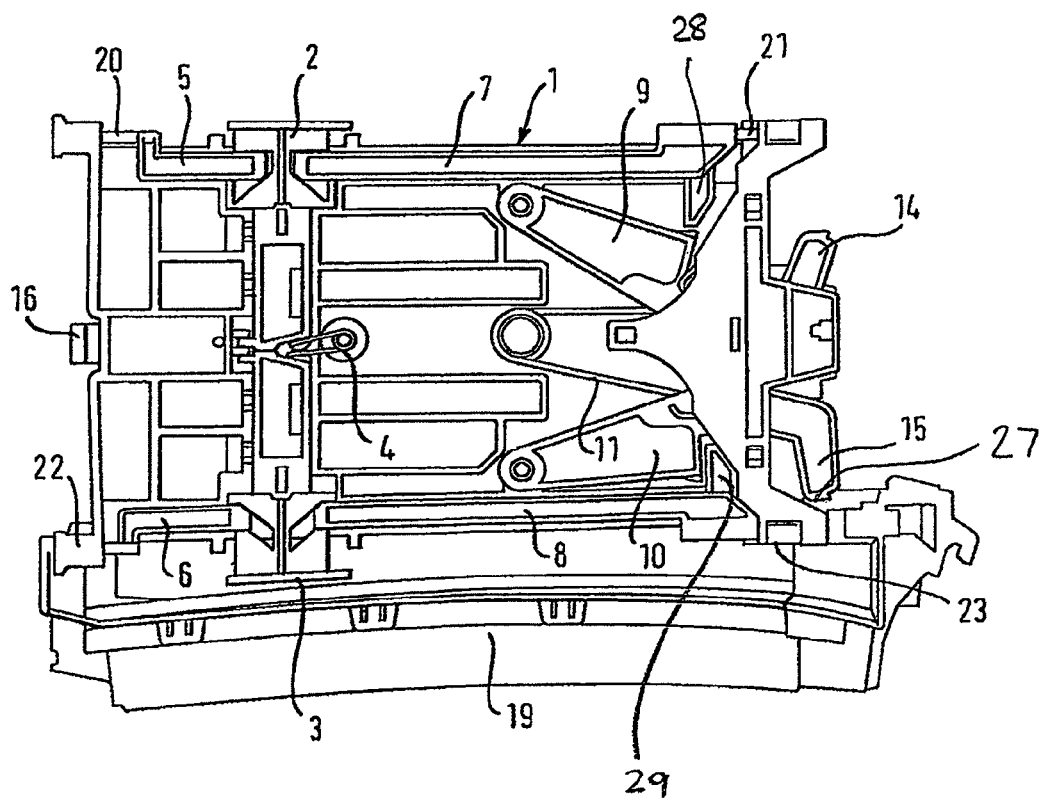
FIG. 2 shows a function carrier frame connected to a side frame part of the device according to the invention

FIG. 2 shows a function carrier frame 1 connected to a side part 19 of a device according to the invention whereby the function carrier frame 1 is in open position. The actuation of the carrier button 2 causes the front slide 5 and the rear slide 7 to be pulled towards each other in the direction of the longitudinal axis of the carrier button 2 by means of diagonal guides. This causes the pivot pins 20, 21 connected to the slides 5, 7 to be pulled out of the holders on the frame or receptacle (not shown). However, the slides 6, 8 remain in their original position within the holders 22 and 23 and this facilitates a swivel movement about the pivot pins.

In its actuated position, the carrier button 2 presses on the upper free limb of the spring 4. The carrier buttons 2, 3 have holding lugs on each of their ends facing the spring 4 which engage in latching holders on the blocking device 16. This blocking device 16 makes it impossible for both carrier buttons 2, 3 to be pressed at the same time. This also prevents the pivot pin from being pulled out of the holders 22, 23. The rear slide 7 has a holding lug 28 on the end facing away from the carrier button 2 which presses the positioning lock 9 in the direction of the free limb of the spring 11. This also guides the latching lug 14 out of its first position into a second position. On the other hand, the symmetrical latching lug 15 arranged on the other side of the function carrier frame 1 remains in its first position and hence in sliding engagement with the guide 27 arranged on the side part of the frame or receptacle.

Figure 3:
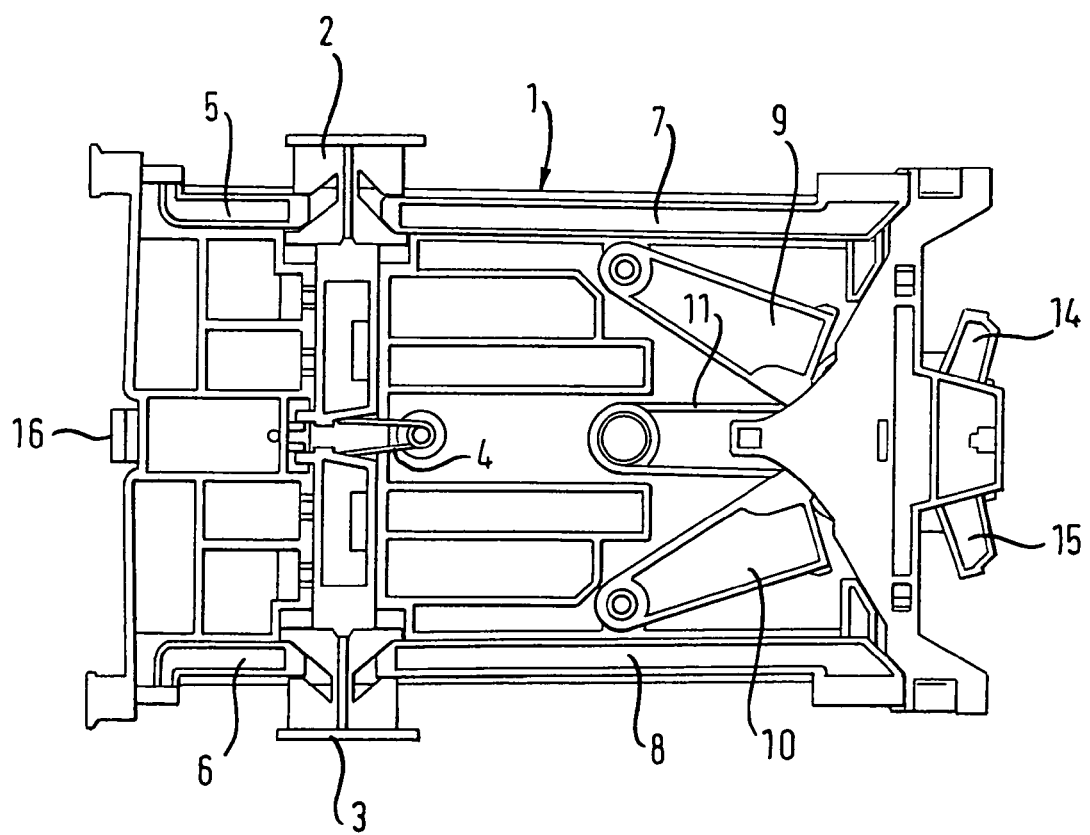
FIG. 3 shows a function carrier frame of the device according to the invention

FIG. 3 shows a function carrier frame 1 in a position in which neither the carrier button 2 nor the carrier button 3 are actuated. Accordingly, the two free limbs of the spring 4 are not pre-tensioned. The arresting lugs on carrier buttons 2 and 3 are both outside the holder provided on the block device 16. However, the positioning locks connected to the latching lugs 14, 15 are also pre-tensioned against the free limbs of the spring 11. Here, the positioning locks ensure that the lid remains open whereby simultaneously the rear slides 7, 8 are locked. The front slides 5, 6 remain in a position in which the pivot pins connected thereto are led into the respective holders (not shown).

Figure 4:
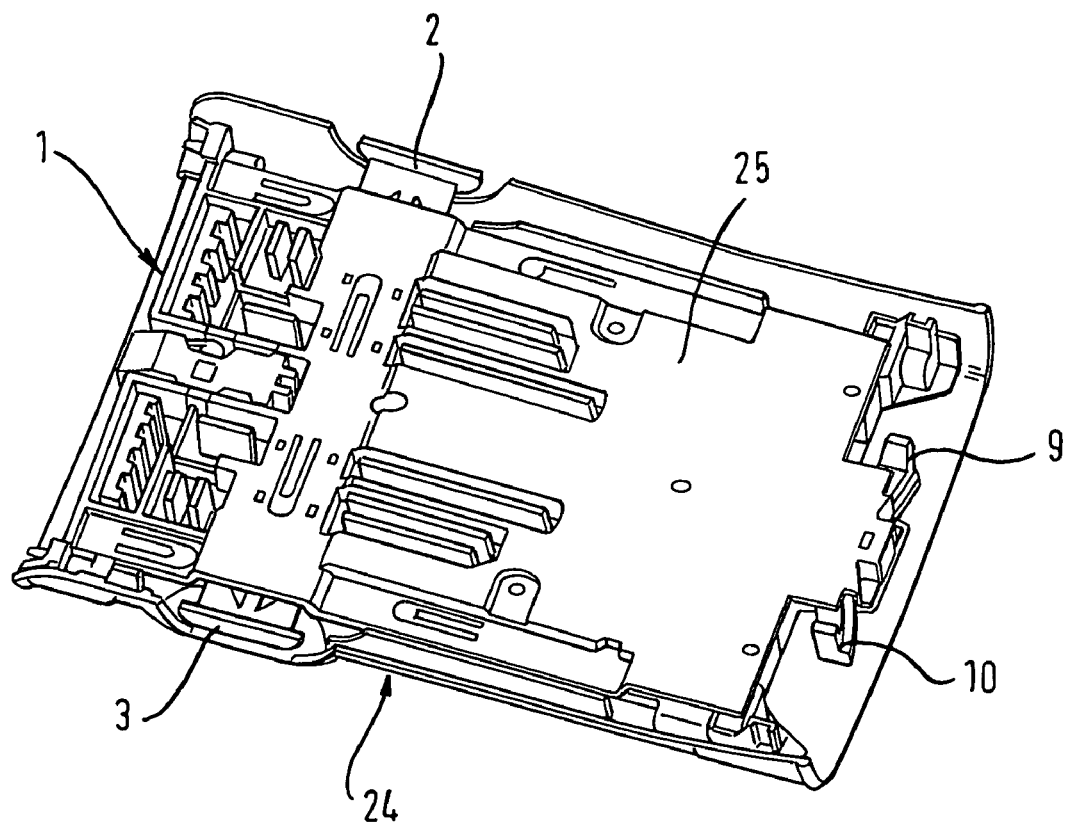
FIG. 4 shows a function carrier frame with a cover and arranged in a lid.

FIG. 4 shows a function carrier frame 1 connected to a lid 24 which is nearly completely covered by an additional cover 25 opposite to the side of the function carrier frame 1 facing away from the lid. Only the carrier buttons 2, 3 and the positioning locks 9, 10 protrude from this cover 25.

What is claimed is:

1. Device for holding objects in a vehicle, comprising:
   a frame or receptacle having side walls with upper closing edges comprising a first guide provided on a first side part of the frame or receptacle and a second guide provided on a second side part of the frame or receptacle,
   at least two arresting devices, and
   a reversibly closable lid comprising a function carrier frame, the function carrier frame further comprising
   a first positioning lock,
   a second positioning lock,
   a first latching lug connected to the first positioning lock, and
   a second latching lug connected to the second positioning lock, and
   an opening and closing mechanism,
   wherein
   the lid is mounted to swivel about rotary axes in the areas of the upper closing edges of the side walls of the frame or receptacle, lying substantially parallel to the closing edges,
   a locking mechanism prevents the simultaneous unlocking of the at least two arresting devices,
   the first latching lug is in a sliding engagement with the first guide when the lid swivels about a first rotary axes, and
   the second latching lug is in the sliding engagement with the second guide when the lid swivels about a second rotary axes.

2. Device according to claim 1, wherein, in closed position, the lid covers the frame or receptacle substantially completely.

3. Device according to claim 1, wherein the at least two arresting devices are arranged on the respective side areas of the device.

4. Device according to claim 1, wherein the arresting devices are arranged on the sides of the lid.

5. Device according to claim 3, wherein the arresting device releases from two sides of the device and the lid swivels about the rotary axis facing the released arresting devices.

6. Device according to claim 1, wherein the lid locks in the open position.

7. Device according to claim 1, wherein the lid swivels in an angle of 80-90° out of the closed position.

8. Device according to claim 1, wherein kinematic parts required for movement of the lid are installed on the function carrier frame.

9. Device according to claim 8, wherein the function carrier frame comprises an additional cover for the kinematic parts.

10. Device according to claim 1, wherein the arresting devices are arranged in the function carrier frame.

11. Device according to claim 1, wherein the receptacle or frame has holders arranged in the area of the upper closing edges of the side walls which, in swiveled or locked position, are engaged with corresponding pivot and locking pins arranged on the lid, and after release of the arresting device are separated from each other on the side opposite the rotary axis.

12. Device according to claim 1, wherein the receptacle or frame has pivot and locking pins in the area of the upper closing edges of the side walls, which in swiveled or locked position are engaged with corresponding holders arranged on the lid and after the release of the arresting devices are separated from each other on the side opposite the rotary axis.

13. Device according to claim 11, wherein the pivot pins are released from the holders by the arresting devices.

14. Device according to claim 13, wherein the locking mechanism permits the release of the pivot pins from the holders on a first side of the device only in cases when the pivot pins on a second side of the device are engaged with the corresponding holders.

15. Center arm rest for use in a vehicle comprising a device according to claim 1.

16. Center arm rest according to claim 15, wherein the device is configured to hold a telephone.

17. Center arm rest according to claim 15, wherein the device further comprises a decorative cover covering at least parts of the device.

18. Device according to claim 1, wherein the first positioning lock, the first latching lug and the first guide, or the second positioning lock, the second latching lug and the second guide cooperate with each other to maintain the reversibly closable lid in an open position.

19. A holding device, comprising:
   a first slide;
   a second slide arranged in parallel to the first slide;
   a first carrier button variously actuating the first slide;
   a second carrier button variously actuating the second slide;
   a blocking device distinct from and interposed between the first carrier button and the second carrier button;
   a first positioning lock; and
   a second positioning lock;
   wherein the blocking device permits the actuation of either the first carrier button or the second carrier button when neither the first carrier button nor the second carrier button is actuated,
   wherein the blocking device prevents the first carrier button from being actuated when the second carrier button is actuated,
   wherein the blocking device prevents the second carrier button from being actuated when the first carrier button is actuated,
   wherein the first slide comprises a first front slide and a first rear slide, wherein the second slide comprises a second front slide and a second rear slide, wherein the first rear slide comprises a holding lug on an end facing away from the first carrier button, wherein the second rear slide comprises a holding lug on an end facing away from the second carrier button, wherein the first holding lug presses the first positioning lock in a direction of a first free limb of a spring when the first carrier button is actuated, and wherein the second holding lug presses the second positioning lock in a direction of a second free limb of the spring when the second carrier button is actuated.

20. The holding device according to claim 19, wherein the first slide, when actuated, releases first pivot pins of the first slide from first holders, and wherein the second slide, when actuated, releases second pivot pins of the second slide from second holders.

21. The holding device according to claim 19, wherein the blocking device engages on holders in the first carrier button and in the second carrier button when preventing the first carrier button or the second carrier button from being actuated.

* * * * *